(12) United States Patent
Desai et al.

(10) Patent No.: US 11,936,081 B2
(45) Date of Patent: Mar. 19, 2024

(54) REDOX ACTIVE LIQUID ELECTROLYTES FOR ORGANIC REDOX FLOW BATTERY

(71) Applicant: ExxonMobil Technology and Engineering Company, Annandale, NJ (US)

(72) Inventors: Divyaraj Desai, Montville, NJ (US); Michael R. Harper, Jr., Hillsborough, NJ (US); Heather A. Elsen, Bethlehem, PA (US); Jonathan D. Saathoff, Three Bridges, NJ (US); Mehmet D. Ertas, Bethlehem, PA (US); Steven W. Levine, Hopewell, NJ (US)

(73) Assignee: Exxon Mobil Technology and Engineering Company, Annandale, NJ (US)

( * ) Notice: Subject to any disclaimer, the term of this patent is extended or adjusted under 35 U.S.C. 154(b) by 0 days.

(21) Appl. No.: 17/454,810

(22) Filed: Nov. 13, 2021

(65) Prior Publication Data

US 2022/0255105 A1 Aug. 11, 2022

Related U.S. Application Data

(60) Provisional application No. 63/147,775, filed on Feb. 10, 2021.

(51) Int. Cl.
*H01M 8/18* (2006.01)
*H01M 4/36* (2006.01)
*H01M 4/60* (2006.01)

(52) U.S. Cl.
CPC .......... *H01M 8/188* (2013.01); *H01M 4/368* (2013.01); *H01M 4/60* (2013.01); *H01M 2300/0002* (2013.01)

(58) Field of Classification Search
CPC ........ H01M 8/188; H01M 4/368; H01M 4/60; H01M 2300/0002
See application file for complete search history.

(56) References Cited

U.S. PATENT DOCUMENTS

2018/0223210 A1* 8/2018 Patil ..................... C10M 171/02

OTHER PUBLICATIONS

Smith et al. :"Proton-Coupled Electron Transfer and Substituent Effects in Catechol-Based Deep Eutectic Solvents: Gross and Fine Tuning of Redox Activity" J. Phys. Chem. B 2017, 121, 10974-10978 (Year: 2017).*
Abbott et al. "Novel solvent properties of choline chloride/urea mixtures", Chem. Commun., 2003, 70-71 (Year: 2017).*
Zhang et., al. Chem 4, 2814-2825, 2018 (Year: 2018).*
Goeltz et. al. Chem. Commun., 2017, 53, 9983-9985 (Year: 2017).*

(Continued)

*Primary Examiner* — Alexander Usyatinsky
(74) *Attorney, Agent, or Firm* — C. Tumey Law Group PLLC

(57) ABSTRACT

A redox flow battery may include: a positive half-cell comprising a catholyte; a negative half-cell comprising an anolyte; and an ion permeable membrane, wherein the ion permeable membrane separates the catholyte and the anolyte, and wherein the catholyte, the anolyte, or both comprise a low-transition temperature material comprising: a redox-active phase; and an ionically conducting organic salt.

13 Claims, 5 Drawing Sheets

(56) References Cited

OTHER PUBLICATIONS

Lourenssen et al., "Vanadium redox flow batteries: A comprehensive review", Journal of Energy Storage 25 (2019) 100844.
Leung et al., "Recent developments in organic redox flow batteries: A critical review", Journal of Power Sources 360 (2017) 243-283.
Evans et al., "Relation Between The Oxidation-Reduction Potentials of Quinones and Their Chemical Structure", Quarterly Reviews Chemical Society 4 (1950), 94-114.
Goeltz et al., "Metal-free redox active deep eutectic solvents", Chem. Commun., 2017, 53, 9983.
Smith et al., "Proton-Coupled Electron Transfer and Substituent Effects in Catechol-Based Deep Eutectic Solvents: Gross and Fine Tuning of Redox Activity", J. Phys Chem B 2017, 121, 10974-10978.

\* cited by examiner

REDOX ACTIVE LIQUID ELECTROLYTES FOR ORGANIC REDOX FLOW BATTERY

CROSS-REFERENCE TO RELATED APPLICATIONS

This application is related to and claims the benefit of priority to U.S. Provisional Application No. 63/147,775 filed Feb. 10, 2021, which is herein incorporated by reference in its entirety.

FIELD OF THE INVENTION

This application relates to processes and systems for organic redox flow batteries and, more particularly, embodiments relate to processes and systems utilizing metal-free, multi-component, redox-active, and ionically conductive low-transition temperature materials in redox flow batteries.

BACKGROUND OF THE INVENTION

Redox flow batteries comprise of electrochemically active electrolytes separated by an ion permeable membrane. Electrochemical energy is reversibly stored in the electrolytes is converted into electrical power, and the electrochemical circuit is completed by the migration of ions across the ion permeable membrane. During the discharge cycle of the redox flow battery, a first redox species may be oxidized in the negative half-cell which generates one or more electrons which may flow into an electrode connected to an external circuit. Simultaneously in the positive half-cell, a second redox species may be reduced by accepting one or more electrons from an electrode connected to the external circuit. Ions are exchanged across the ion permeable membrane such that the two half-cells maintain charge neutrality. Redox flow batteries may have many advantages in energy storage applications as redox flow batteries are stable over a wide temperature range with no carbon emissions.

Redox flow batteries have some operational and design challenges as the solubility of the redox species restrict the energy density of the half-cells thereby limiting the suitability for some applications where greater energy density is required. For example, the energy density of commercially available vanadium redox flow batteries (VRFB) is only about 15-25 Watt-hours per liter (Wh L−1) which is substantially lower than the current Li-ion battery energy density of about 250-693 Wh L−1. In VRFB applications, the mole fraction of the redox active component of the flow battery is limited to less than 10 percent leading to the relatively lower energy density as compared to lithium-ion batteries. Improving the concentration of the redox-active phase would help improve the energy density and reduce system cost, as a smaller volume of solvent is being utilized per unit of redox-active phase.

Further challenges may exist with sourcing raw mineral resources required to manufacture the redox species. Commercially available batteries such as lithium-ion require lithium and cobalt to manufacture and vanadium redox flow batteries are dependent upon availability of vanadium oxide (V2O5). The availability and price of raw materials are limiting factors in the production of current battery technology. By comparison, the prevalence of organic hydrocarbon-based compounds is considerably greater. Replacing metal-based batteries with a more inexpensive organic redox couple metal-free battery designs would reduce energy storage costs.

SUMMARY OF THE INVENTION

Disclosed herein are processes and systems for organic redox flow batteries. A low-transition temperature material composition may include: a redox-active phase; and an ionically conducting organic salt.

Further disclosed herein is an example method of making a low-transition temperature material which may include: combining a redox-active phase and an ionically conducting organic salt to form a solid composite; and melting the mixture to form the low-transition temperature material, wherein the low-transition temperature material has a melting point of less than 100° C.

Further disclosed herein in an example redox flow battery comprising: a positive half-cell comprising a catholyte; a negative half-cell comprising an anolyte; and an ion permeable membrane, wherein the ion permeable membrane separates the catholyte and the anolyte, and wherein the catholyte, the anolyte, or both comprise a low-transition temperature material comprising: a redox-active phase; and an ionically conducting organic salt.

BRIEF DESCRIPTION OF THE DRAWINGS

The drawings illustrate certain aspects of the present disclosure and should not be used to limit or define the disclosure.

DETAILED DESCRIPTION OF THE INVENTION

Figure 1:
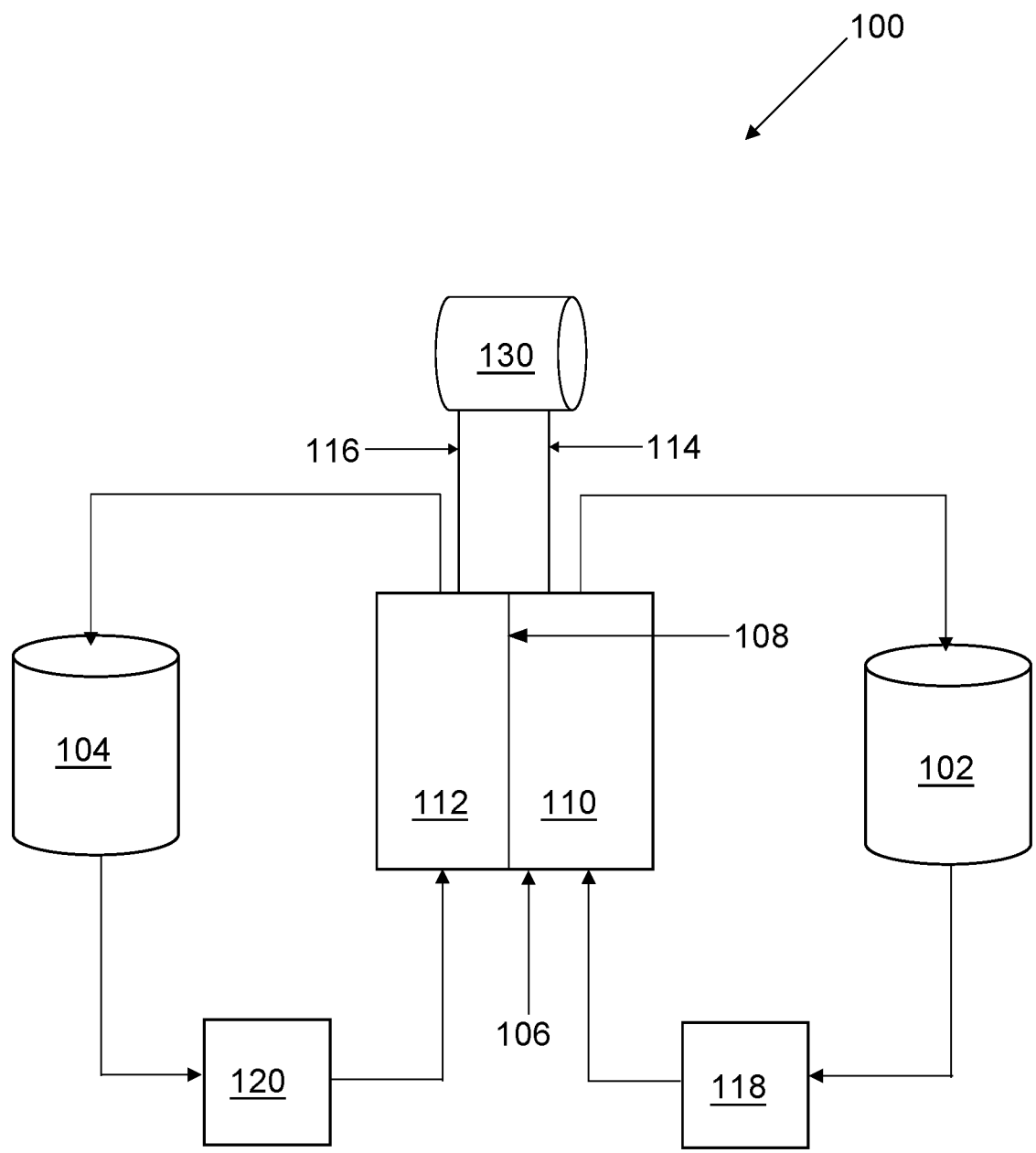
FIG. 1 is a schematic illustration of a redox flow battery.

The following is a detailed description of the disclosure provided to aid those skilled in the art in practicing the present disclosure. Those of ordinary skill in the art may make modifications and variations in the embodiments described herein without departing from the spirit or scope of the present disclosure. Unless otherwise defined, all technical and scientific terms used herein have the same meaning as commonly understood by one of ordinary skill in the art to which this disclosure belongs. The terminology used in the description of the disclosure herein is for describing particular embodiments only and is not intended to be limiting of the disclosure.

This application relates to processes and systems for organic redox flow batteries and, more particularly, embodiments relate to processes and systems utilizing metal-free, multi-component, redox-active, and ionically conductive low-transition temperature materials (LTTM) in redox flow batteries. There may be several potential advantages to the methods and systems disclosed herein, only some of which may be alluded to in the present disclosure. As discussed above, current chemistry used in redox flow batteries may be limited by the solubility of the redox species in the solvent. The low-transition temperature material may have a melting temperature of less than 100° C. The electrochemical potential of the redox-active low-transition temperature material is large enough for use as a negative electrolyte (anolyte) solution and positive electrolyte (catholyte) solution in a redox flow battery. The redox flow battery may be solvent-free, where the two half-cells of the redox flow battery comprise mainly the low-transition temperature material thereby allowing a larger mole fraction of the low-transition temperature material to be present in solution leading to greater energy density. The materials disclosed herein can undergo multi-electron charge transfer reactions and may achieve an energy density of greater than 100 Wh L−1. Further, the low-transition temperature material may be synthesized from hydrocarbons thereby eliminating the challenges associated with availability of mined materials.

Some organic compounds can store electrochemical energy by undergoing multi-electron reversible redox charge transfer reactions. A class of compounds, known as quinones or diones (Q) is characterized by the presence of an aromatic core and two carbonyl groups. These compounds can reversibly react to produce equivalent hydroquinones, or aromatic diol, by converting the carbonyl positions into hydroxyls. As an example of this reaction, o-benzoquinone reversibly undergoes a 2-electron reaction to produce catechol as shown in Reaction 1. The reduction potential of Reaction 1 is 0.85 V compared to the standard hydrogen electrode (SHE).

Reaction 1

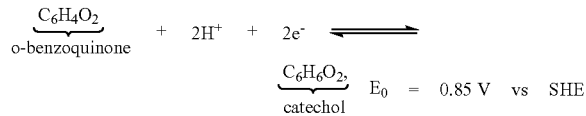

The reversible charge transfer arises from resonant stabilization from the o-benzoquinone to produce o-hydroquinone illustrated in Reaction 2. A linear relationship is observed between the o-quinone redox potential and the resonance energy difference between o-hydroquinone and o-quinone.

Reaction 2

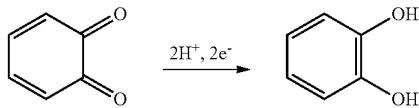

The low-transition temperature materials (LTTM) are a multi-component combination of Lewis/Brønsted acids and bases which when mixed result in a homogeneous phase with a melting point that is lower than that of any of the pure components. The LTTM may comprise at least one redox-active phase comprising a species capable of undergoing oxidation-reduction and at least one ionically conducting organic salt. The redox-active phase may act as a hydrogen bond donor in the LTTM while the ionically conducting organic salt may act as a hydrogen bond acceptor. In some embodiments, an additional hydrogen bond acceptor may be included in the LTTM to increase the mole fraction of redox-active component in the anolyte and/or catholyte.

The redox-active phase may comprise an organic compound capable of undergoing a redox reaction. Some organic compounds capable of undergoing a redox reaction may include, without limitation, cyclic polyols, dicarboxylic nitrogen heterocycles, and combinations thereof. Further suitable organic compounds may include cyclic dibasic organic acids such as squaric acid, naphthalenediol, catechol, nitrocatechol, catechol and nitrocatechol substituted by one or more hydrocarboxyl groups with carbon numbers from C1-C10, dihydroxybenzaldehyde, nitrodihydroxybenzaldehyde, dihydroxybenzaldehyde and nitrodihydroxybenzaldehyde substituted by one or more hydrocarboxyl groups with carbon numbers from C1-C10, maleimide, imidazolidinone, parabanic acid, N-aminophthalimide, phthalimide, 2,3-naphthalenedicarboximide, 3-aminophthalhydrazide, urazole, and combinations thereof. The ionically conducting organic salt may be any quaternary ammonium salt capable of participating in a redox reaction with the organic compound. Some suitable quaternary ammonium salts may include choline chloride, distearylammonium chloride, glycine betaine, alkyl dibenzylammonium chloride, dodecyl dimethylammonium chloride and benzalkonium chloride, ionic liquids containing alkylimidazolium, phosphonium or ammonium cations, ionic liquids containing bis(trifluorosulfonylimide), tetrafluoroborate, hexafluorophosphate anions, and combinations thereof. Additional hydrogen bond donors may include any compounds capable of accepting a hydrogen bond, including, but not limited to ethylene glycol, glycerin, urea, lactic acid, sulfuric acid, and combinations thereof.

Figure 2:
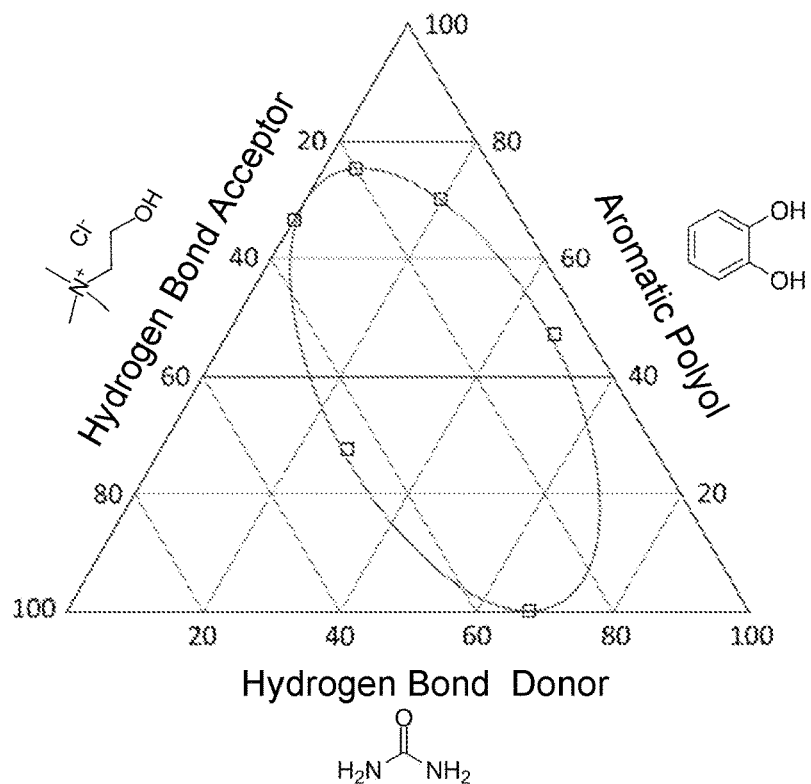
FIG. 2 is a ternary phase diagram of catechol-choline chloride-urea.
Figure 3:
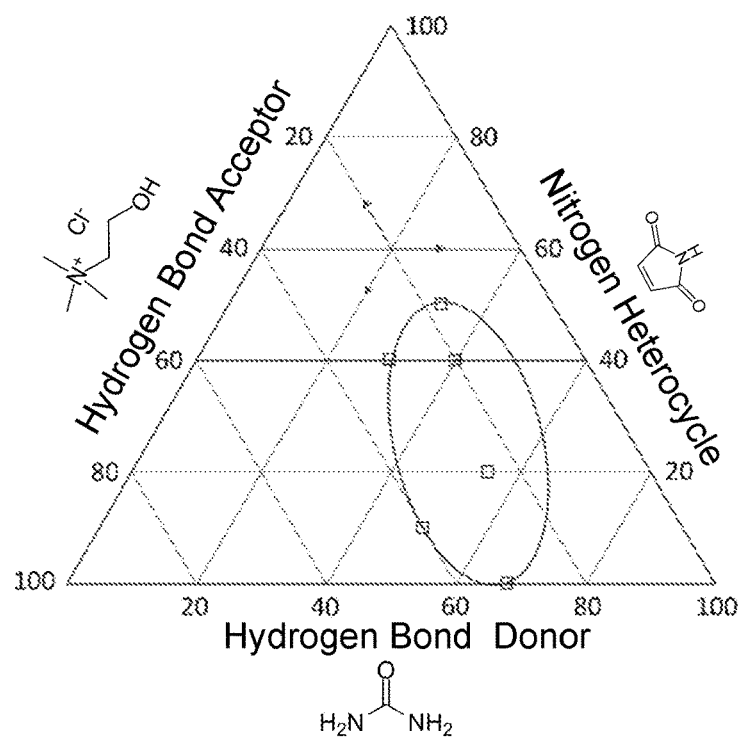
FIG. 3 is a ternary phase diagram of maleimide-choline chloride-urea.

The LTTM composition may be made by mixing the organic compound, the ionically conducting organic salt, and optionally the additional hydrogen bond donor and heating the mixture until a homogeneous phase is produced. The mole fraction of each component of the LTTM composition should be selected such that the resultant LTTM is a liquid at temperatures below 100° C. FIG. 2 is an isothermal ternary phase diagram of catechol-choline chloride-urea and FIG. 3 is an isothermal ternary phase diagram of maleimide-choline chloride-urea. In FIGS. 2 and 3, the soluble phase space is shown by a circle which indicates the molar fractions of each component where the LTTM is a liquid at the given temperature. In general, the organic compound may be present in an amount of about 1 wt. % to about 80 wt. % by weight of the LTTM, the ionically conducting organic salt about 1 wt. % to about 80 wt. % by weight of the LTTM, and the additional hydrogen bond donor may be present in an amount of about 1 wt. % to about 80 wt. % by weight of the LTTM. Alternatively, the organic compound may be present in an amount of about 1 wt. % to about 80 wt. % by weight of the LTTM, the ionically conducting organic salt about 1 wt. % to about 50 wt. % by weight of the LTTM, and the additional hydrogen bond donor may be present in an amount of about 1 wt. % to about 80 wt. % by weight of the LTTM.

Some LTTMs may utilize binary or tertiary combinations of organic compound, ionically conducting organic salt, and additional hydrogen bond donor. Some exemplary LTTMs may include a binary combination of a quaternary ammonium salt and a redox-active cyclic ortho-diol to produce a metal-free catholyte with a cell potential of greater than 800 mV versus SHE. Another exemplary LTTM may include a ternary combination of a quaternary ammonium salt, a redox-active cyclic ortho-diol and an additional hydrogen bond donor to produce a metal-free anolyte with a cell potential of greater than 800 mV versus SHE and a melting point of less than 100° C. The additional hydrogen bond donor may increase the mole fraction of the redox-active species. Another exemplary LTTM material may include a ternary combination of a quaternary ammonium salt, a redox-active nitrogen heterocycle, and an additional hydrogen bond donor to produce a metal-free anolyte with a cell potential of less than 0 mV versus SHE and a melting point of less than 100° C. Another exemplary LTTM may include a ternary combination of a quaternary ammonium salt, a redox-active nitrogen heterocycle, and a hydrogen bond donor to produce a metal-free catholyte with a cell potential of greater than 800 mV versus SHE and a melting point of less than 100° C.

An application of the LTTMs disclosed herein may be as solvent-free anolytes and/or catholytes in redox flow batteries. Solvent-free LTTMs may have several advantages including greater energy density as compared to applications where solvents are used. When used as an electrolyte, either anolyte or catholyte, the LTTM may be major component of the electrolyte. In embodiments, the LTTM may be present in the electrolyte in an amount of about 20 mol % to about 90 mol % or greater, with the balance being a solvent. In some examples, the LTTM may be 100 mol % of the electrolyte. Alternatively, the LTTM may be present in an amount of 90 mol % to about 95 mol %, or greater.

A redox flow battery may include a redox cell containing a positive half-cell and a negative half-cell separated by an ion-permeable membrane. In an embodiment, either the positive half-cell or the negative half-cell may include an LTTM disclosed herein where the half-cell which does not contain an LTTM may be a solid-state electrode or a gaseous half-cell comprising of either a fuel or oxidant. In another embodiment, the positive half-cell may include a catholyte comprising an LTTM disclosed herein and the negative half-cell may include an anolyte comprising an LTTM disclosed herein. While in principle any combinations of LTTMs may be used, it may be desired to select the catholyte and anolyte to provide certain properties to the redox cell such as cell potential (Ecell) and energy density. Cell potential may be readily calculated from the reduction potentials of the LTTMs selected, or in the case where the same LTTM is utilized as an anolyte and catholyte, the reduction potential of the singular LTTM. Further the energy density of the redox cell may be determined by cell potential (Ecell), solubility (Credox), and number of electrons exchanged in a charge-transfer reaction (z). In some embodiments, it may be desired to select LTTMs to maximize cell energy density.

FIG. 1 illustrates a redox flow battery 100 which may utilize the LTTM compositions discussed herein. Redox flow battery 100 may comprise redox cell 106 which may further comprise negative half-cell 110 containing an LTTM anolyte and positive half-cell 112 containing LTTM catholyte. The anolyte and catholyte may be any of the LTTM compositions disclosed herein. Alternatively, either the positive half-cell 112 or the negative half-cell 110 may include an LTTM disclosed herein and the other half-cell may be a solid-state electrode or a gaseous half-cell comprising of either a fuel or oxidant. Ion permeable membrane 108 separates negative half-cell 110 and positive half-cell 112, preventing bulk mixing between the anolyte and catholyte while still allowing ions to diffuse across ion permeable membrane 108. Ion permeable membrane 108 may be constructed from any suitable materials capable of diffusing anions, cations, or both through ion permeable membrane 108. Generally, ion permeable membrane 108 may include a polymer which has the desired properties for a particular application. Redox cell 106 may further contain anode 114 and cathode 116 which may each individually be in electrical contact with anolyte and catholyte respectively. Anode 114 and cathode 116 may be further electrically connected to an external load 130, e.g. an electric circuit, thereby providing electrical power to the external load.

Redox flow battery may include anolyte vessel 102 containing LTTM anolyte and catholyte vessel 104 containing the LTTM catholyte. The LTTM anolyte and LTTM catholyte may be pumped using pump 118 and pump 120 respectively into each half-cell in redox cell 106. When discharging redox flow battery 100 to provide power to the external load, LTTM anolyte in negative half-cell 110 may be oxidized which releases one or more electrons through anode 114. Simultaneously, LTTM catholyte in positive half-cell 112 may accept one or more electrons from cathode 116 and reduce the LTTM catholyte. Ion exchange occurs across ion permeable membrane 108 to balance the charges in negative half-cell 110 and positive half-cell 112.

Accordingly, the preceding description describes examples of processes and systems for organic redox flow batteries. The processes and systems disclosed herein may include any of the various features disclosed herein, including one or more of the following embodiments.

Statement 1. A low-transition temperature material composition comprising: a redox-active phase; and an ionically conducting organic salt.

Statement 2. The composition of statement 1, wherein the redox-active phase comprises at least one member selected from the group consisting of a cyclic polyol, dicarboxylic nitrogen heterocycle, and combinations thereof.

Statement 3. The composition of any of statements 1-2, wherein the redox-active phase comprises at least one organic compound selected from the group consisting of squaric acid, naphthalenediol, catechol, nitrocatechol, catechol and nitrocatechol substituted by one or more hydrocarboxyl groups with carbon numbers from C1-C10, dihydroxybenzaldehyde, nitrodihydroxybenzaldehyde, dihydroxybenzaldehyde and nitrodihydroxybenzaldehyde substituted by one or more hydrocarboxyl groups with carbon numbers from C1-C10, maleimide, imidazolidinone, parabanic acid, N-aminophthalimide, phthalimide, 2,3-naphthalenedicarboximide, 3-aminophthalhydrazide, urazole, and combinations thereof.

Statement 4. The composition of any of statements 1-3, wherein the ionically conducting organic salt comprises a quaternary ammonium salt capable of participating in a redox reaction with the redox-active phase.

Statement 5. The composition of statement 4, wherein the conducting organic salt comprises a compound selected from the group consisting of: choline chloride; distearylammonium chloride; glycine betaine; alkyl dibenzylammonium chloride; dodecyl dimethylammonium chloride; benzalkonium chloride; ionic liquids containing alkylimidazolium, phosphonium or ammonium cations; ionic liquids containing bis(trifluorosulfonylimide), tetrafluoroborate, and/or hexafluorophosphate anions; and combinations thereof.

Statement 6. The composition of any of statements 1-5, further comprising an additional hydrogen bond donor selected from the group consisting of ethylene glycol, glycerin, urea, lactic acid, sulfuric acid, and combinations thereof.

Statement 7. The composition of any of statements 1-6, wherein the low-transition temperature material has a melting point of less than 100° C.

Statement 8. The composition of any of statements 1-7, wherein redox-active phase comprises benzene-1,2-diol, the ionically conducting organic salt comprises choline chloride, and wherein the low-transition temperature material composition further comprises urea.

Statement 9. The composition of any of statements 1-7, wherein redox-active phase comprises maleimide, the ionically conducting organic salt comprises choline chloride, and wherein the low-transition temperature material composition further comprises urea.

Statement 10. A method of making a low-transition temperature material comprising: combining a redox-active phase and an ionically conducting organic salt to form a solid composite; and melting the mixture to form the low-transition temperature material, wherein the low-transition temperature material has a melting point of less than 100° C.

Statement 11. The method of statement 10, wherein the redox-active phase comprises at least one member selected from the group consisting of a cyclic polyol, dicarboxylic nitrogen heterocycle, and combinations thereof.

Statement 12. The method of any of statements 10-11, wherein the redox-active phase comprises at least one organic compound selected from the group consisting of squaric acid, naphthalenediol, catechol, nitrocatechol, catechol and nitrocatechol substituted by one or more hydrocarboxyl groups with carbon numbers from C1-C10, dihydroxybenzaldehyde, nitrodihydroxybenzaldehyde, dihydroxybenzaldehyde and nitrodihydroxybenzaldehyde substituted by one or more hydrocarboxyl groups with carbon numbers from C1-C10, maleimide, imidazolidinone, parabanic acid, N-aminophthalimide, phthalimide, 2,3-naphthalenedicarboximide, 3-aminophthalhydrazide, urazole, and combinations thereof.

Statement 13. The method of any of statements 10-12, wherein the ionically conducting organic salt comprises a quaternary ammonium salt capable of participating in a redox reaction with the redox-active phase.

Statement 14. The method of any of statements 10-13, wherein the conducting organic salt comprises a compound selected from the group consisting of: choline chloride; distearylammonium chloride; glycine betaine; alkyl dibenzylammonium chloride; dodecyl dimethylammonium chloride; benzalkonium chloride; ionic liquids containing alkylimidazolium, phosphonium or ammonium cations; ionic liquids containing bis(trifluorosulfonylimide), tetrafluoroborate, and/or hexafluorophosphate anions; and combinations thereof.

Statement 15. The method of any of statements 10-14, wherein the low-transition temperature material further comprising an additional hydrogen bond donor selected from ethylene glycol, glycerin, urea, lactic acid, sulfuric acid, and combinations thereof.

Statement 16. A redox flow battery comprising: a positive half-cell comprising a catholyte; a negative half-cell comprising an anolyte; and an ion permeable membrane, wherein the ion permeable membrane separates the catholyte and the anolyte, and wherein the catholyte, the anolyte, or both comprise a low-transition temperature material comprising: a redox-active phase; and an ionically conducting organic salt.

Statement 17. The redox flow battery of statement 16, wherein the catholyte, the anolyte, or both the catholyte and the anolyte, comprise at least 90 mol % of the low-transition temperature material.

Statement 18. The redox flow battery of statements 16-17, wherein the redox-active phase comprises a cyclic polyol, dicarboxylic nitrogen heterocycle, or combinations thereof.

Statement 19. The redox flow battery of statements 16-18, wherein the redox-active phase comprises at least one organic compound selected from the group consisting of squaric acid, naphthalenediol, catechol, nitrocatechol, catechol and nitrocatechol substituted by one or more hydrocarboxyl groups with carbon numbers from C1-C10, dihydroxybenzaldehyde, nitrodihydroxybenzaldehyde, dihydroxybenzaldehyde and nitrodihydroxybenzaldehyde substituted by one or more hydrocarboxyl groups with carbon numbers from C1-C10, maleimide, imidazolidinone, parabanic acid, N-aminophthalimide, phthalimide, 2,3-naphthalenedicarboximide, 3-aminophthalhydrazide, urazole, and combinations thereof.

Statement 20. The redox flow battery of statements 16-19, wherein the ionically conducting organic salt comprises a quaternary ammonium salt capable of participating in a redox reaction with the redox-active phase, wherein the conducting organic salt comprises a compound selected from the group consisting of choline chloride, distearylammonium chloride, glycine betaine, alkyl dibenzylammonium chloride, dodecyl dimethylammonium chloride, benzalkonium chloride, ionic liquids containing alkylimidazolium, phosphonium or ammonium cations, ionic liquids containing bis(trifluorosulfonylimide), tetrafluoroborate, and/or hexafluorophosphate anions, and combinations thereof.

Statement 21. The redox flow battery of statements 16-20, wherein the low-transition temperature material further comprises an additional hydrogen bond donor selected from ethylene glycol, glycerin, urea, lactic acid, sulfuric acid, and combinations thereof.

Statement 22. The redox flow battery of statements 16-21, wherein the low-transition temperature material has a melting point of less than 100° C.

EXAMPLES

To facilitate a better understanding of the present disclosure, the following example of certain aspects of some embodiments are given. In no way should the following examples be read to limit, or define, the entire scope of the disclosure.

Example 1

An investigation of redox potentials of quinones was performed. Density functional theory (DFT) calculations were performed for quinones and their complementary hydroquinones, using the 1996 Perdew-Burke-Ernzerhof exchange-correlation functional. Solvation models including the Polarizable Continuum Model and the Solvent Model Density were applied, using solvent-specific parameters for ethanol or water. The heat of reaction (hydroquinone enthalpy subtracted by the quinone enthalpy) was calculated for each quinone/hydroquinone pair. A linear relationship was found to exist between a quinone's redox potential and its heat of reaction. Six experimental redox potentials were determined and using the previously determined DFT predicted heats of reaction, the parameters for the linear relationship between the quinone's redox potential and the heat of reaction was determined. Thus, a novel quinone's redox potential can be estimated by substituting the quinone's DFT predicted heat of reaction into the linear correlation.

Example 2

An investigation of molecular dynamics of LTTM solubility was performed. Molecular Dynamics simulations were run with the Optimized Potentials for Liquid Simulations All-Atom (OPLS-AA) force field on a variety of redox active electrolytes to rank their solubility in a number of solvents including LTTMs as well as more typical solvents including ethanol, 1,4-dioxane, dimethylformamide, and dimethyl sulfoxide. Each simulation consisted of a single redox active electrolyte solute molecule and a number of solvent molecules. Infinite dilution excess chemical potentials were calculated through a free energy perturbation method. For each solute molecule in the range of solvents considered, the relative solubility was ranked with these infinite dilution excess chemical potentials, with a smaller value indicating a greater solubility.

Example 3

The investigations from Examples 1 and 2 were utilized to select LTTM compositions to prepare. Metal-free LTTM compositions were prepared by measuring and mixing selected compositions of the pure LTTM components as shown in the tables below and thereafter heating at 100° C. until a single homogenous phase was produced. Table 1 shows binary LTTM catholytes containing a redox-active cyclic ortho-diol without a hydrogen bond donor. Table 2 shows binary LTTM catholytes containing a redox-active cyclic ortho-diol with a hydrogen bond donor comprising ethylene glycol. Table 3 shows ternary LTTM catholytes containing a redox-active cyclic ortho-diol. Table 4 shows ternary LTTM anolytes containing a nitrogen heterocycle. Table 5 shows ternary catholytes containing a redox-active nitrogen heterocycle.

TABLE 1

| Hydrogen Bond Acceptor (HBA) | Redox-Active Hydrogen Bond Donor (RHBD) | Hydrogen Bond Donor (HBD) | Redox Potential (mV vs SHE) | Redox mole fraction |
| --- | --- | --- | --- | --- |
| Choline Chloride | Squaric acid | None | 840 | 0.67 |
| | 2,3-naphthalenediol | | 1007 | 0.67 |
| | 4-nitrocatechol | | 996 | 0.50 |
| | 2,3-dihydroxy-benzaldehyde | | 1092 | 0.50 |
| | 5-nitro-2,3-dihydroxybenzaldehyde | | 1228 | 0.50 |

TABLE 2

| Hydrogen Bond Acceptor (HBA) | Redox-Active Hydrogen Bond Donor (RHBD) | Hydrogen Bond Donor (HBD) | Redox Potential (mV vs SHE) | Redox mole fraction |
| --- | --- | --- | --- | --- |
| None | Catechol | Ethylene glycol | 835 | 0.60 |
| | 4-methylcatechol | | 768 | 0.60 |

TABLE 3

| Hydrogen Bond Acceptor (HBA) | Redox-Active Hydrogen Bond Donor (RHBD) | Hydrogen Bond Donor (HBD) | Redox Potential (mV vs SHE) | Redox mole fraction |
| --- | --- | --- | --- | --- |
| Choline Chloride | Catechol | Urea | 835 | 0.70 |
| | Squaric acid | | 840 | 0.70 |
| | 2,3-naphthalenediol | | 1007 | 0.70 |
| | 4-nitrocatechol | | 996 | 0.60 |
| | 2,3-dihydroxy-benzaldehyde | | 1092 | 0.60 |
| | 5-nitro-2,3-dihydroxybenzaldehyde | | 1228 | 0.60 |

TABLE 4

| Hydrogen Bond Acceptor (HBA) | Redox-Active Hydrogen Bond Donor (RHBD) | Hydrogen Bond Donor (HBD) | Redox Potential (mV vs SHE) | Redox mole fraction |
| --- | --- | --- | --- | --- |
| Choline Chloride | Maleimide | Urea | −148 | 0.50 |
| | Parabanic acid | | −327 | 0.40 |
| | N-aminophthalimide | | −437 | 0.40 |
| | Phthalimide | | −506 | 0.40 |
| | 2,3-naphthalene-dicarboximide | | −630 | 0.20 |
| | 3-aminophthal-hydrazide | | −885 | 0.10 |

TABLE 5

| Hydrogen Bond Acceptor (HBA) | Redox-Active Hydrogen Bond Donor (RHBD) | Hydrogen Bond Donor (HBD) | Redox Potential (mV vs SHE) | Redox mole fraction |
| --- | --- | --- | --- | --- |
| Choline Chloride | Urazole | Urea | 1069 | 0.40 |

Example 4

Figure 4:
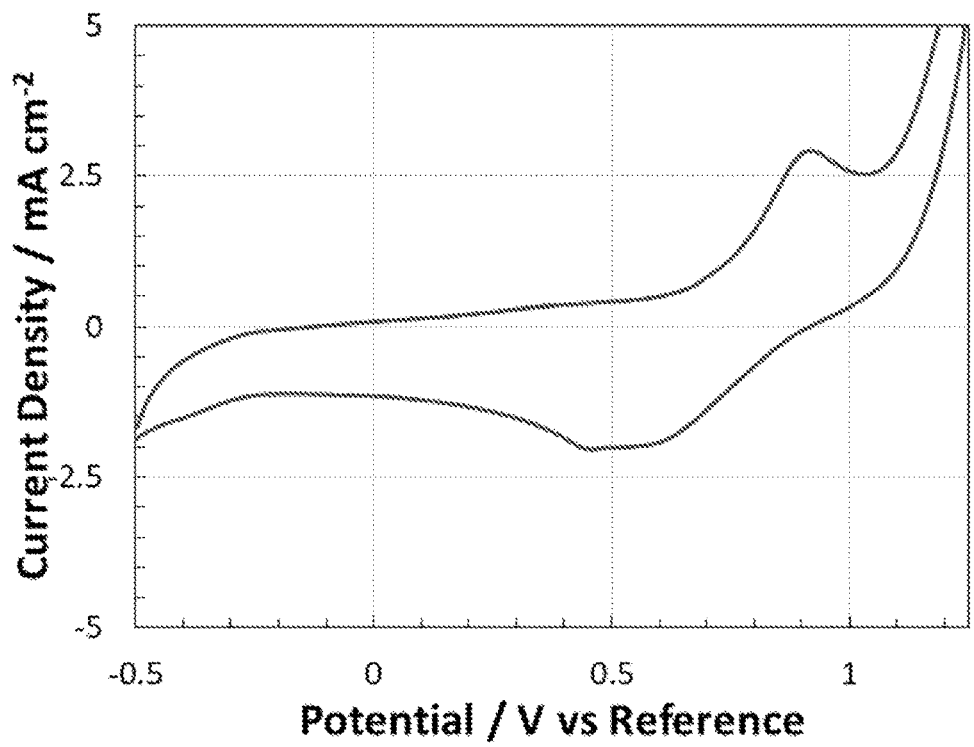
FIG. 4 is a cyclic voltammogram of 4-nitrocatechol in 95% ethanol-5% 1 M aqueous HCl solution.
Figure 5:
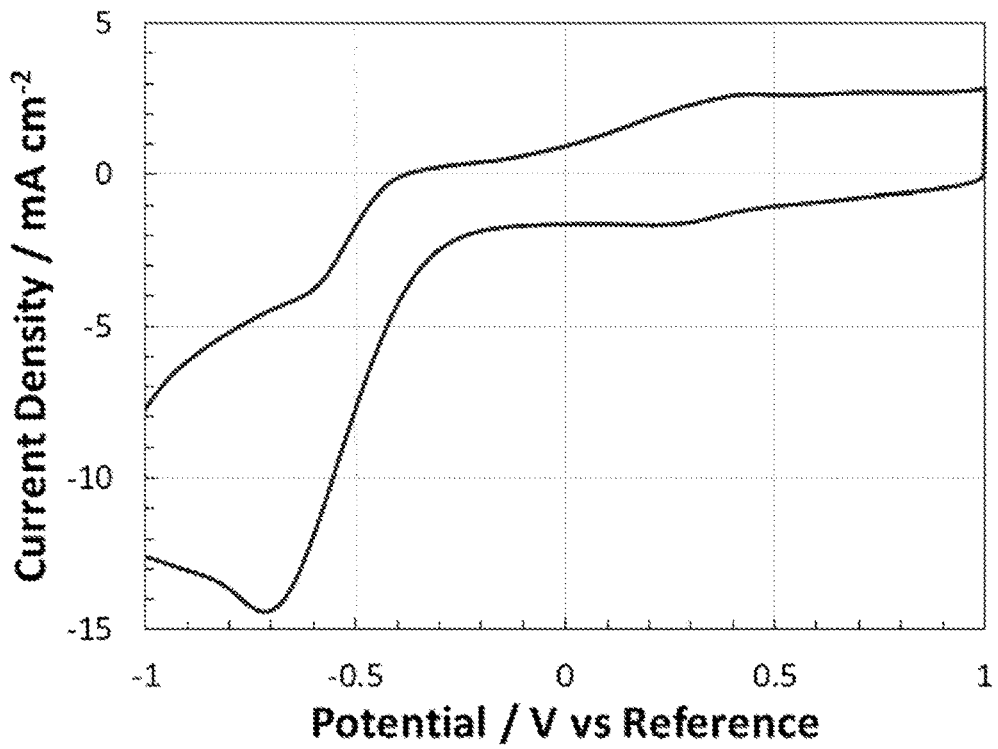
FIG. 5 is a cyclic voltammogram of maleimide in 95% ethanol-5% 1M aqueous HCl solution.
Figure 6:
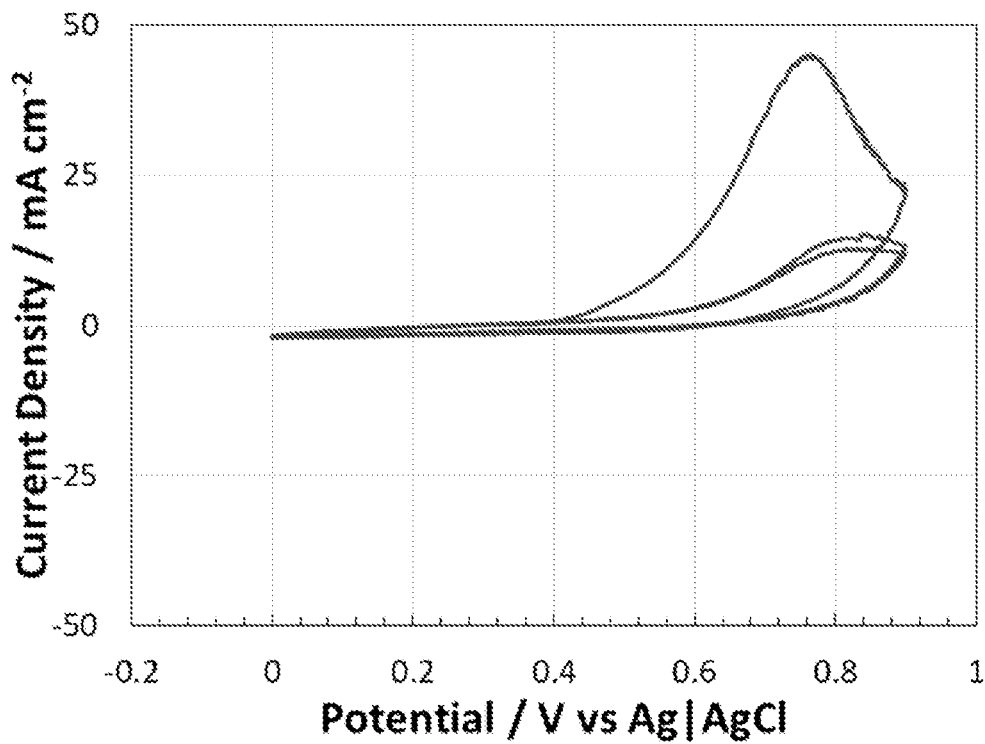
FIG. 6 is a cyclic voltammogram of binary 4-nitrocatechol-choline chloride low transition temperature material (LTTM) in water.
Figure 7:
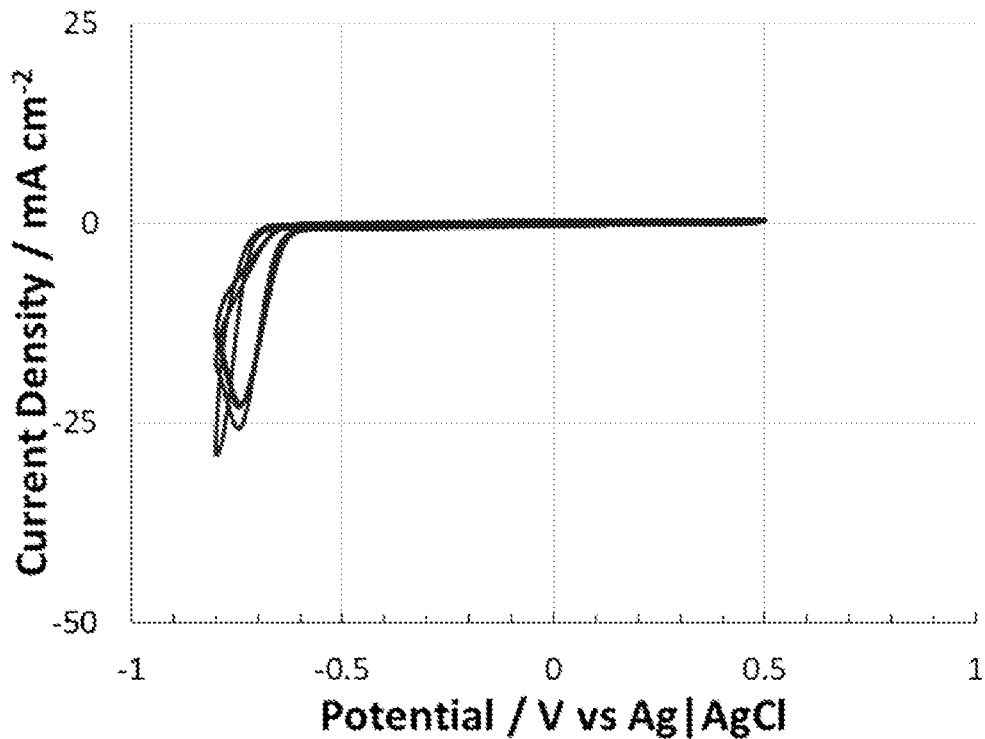
FIG. 7 is a cyclic voltammogram of ternary maleimide-lithium bis(trifluoromethanesulfonyl)imide-urea LTTM in water.

The electrochemical activity of selected LTTM compositions was characterized in a three-electrode cyclic voltammetry cell comprising of a glassy carbon working electrode, silver|silver chloride (Ag|AgCl) reference electrode and a platinum counter electrode. The redox-active component (1 mM) was dissolved in a solvent (95 vol % ethanol+5 vol % water) containing 50 mM hydrochloric acid. Cyclic voltammograms of the selected LTTMs were measured. FIG. 4 is the cyclic voltammogram of 1 mM maleimide in protic solvent (95 vol % ethanol+5 vol % 1M HCl), recorded in a three-electrode setup at 100 mV s$^{-1}$ against a silver-silver chloride (Ag|AgCl) reference electrode. FIG. 5 is the cyclic voltammogram of 1 mM maleimide in protic solvent (95 vol % ethanol+5 vol % 1M HCl) recorded in a three-electrode setup at 100 mV s$^{-1}$ against a silver-silver chloride reference electrode. FIG. 6 is the cyclic voltammogram of binary 4-nitrocatechol (0.25 M)-choline chloride LTTM in water recorded at 100 mV s$^{-1}$ against an Ag|AgCl reference electrode. FIG. 7 is the cyclic voltammogram of ternary maleimide (0.25 M)-lithium bis(trifluoromethanesulfonyl) imide-urea LTTM in water recorded at 100 mV s$^{-1}$ against a Ag|AgCl reference electrode. Each of the tested LTTMs (FIGS. 4-7) was found to have reversible redox peaks on the cyclic voltammogram indicating a reversible redox reaction.

Example 5

Figure 8:
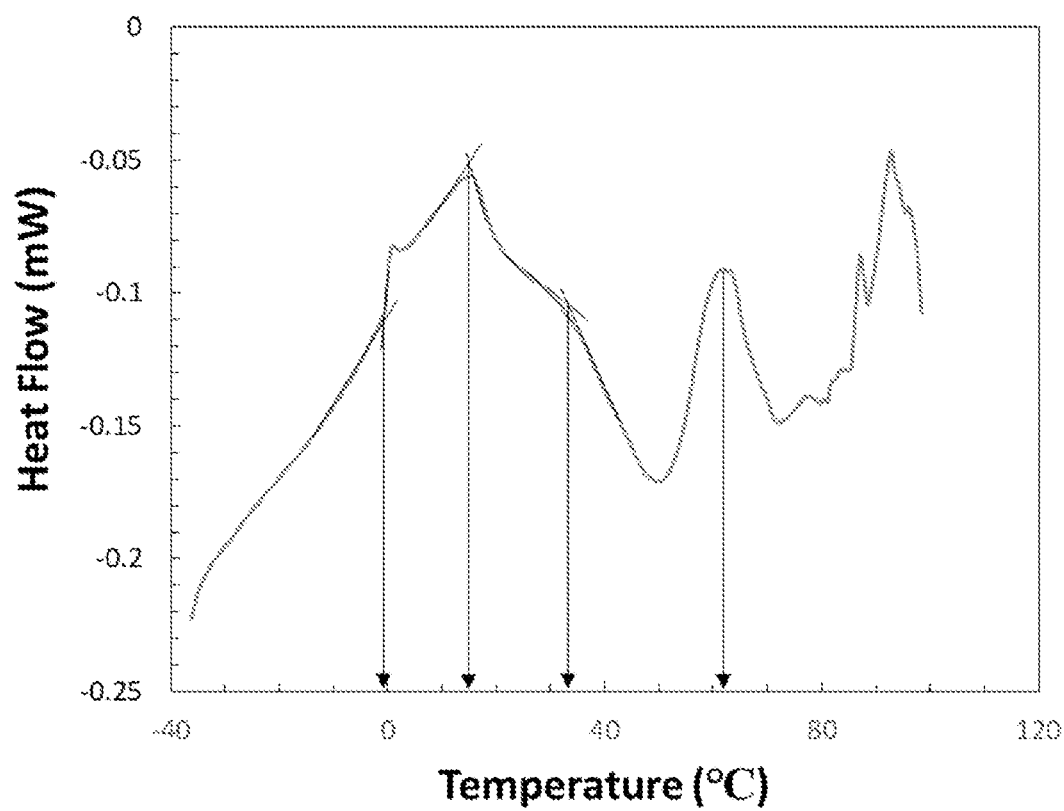
FIG. 8 is a differential scanning calorimetry spectrum of heat flow versus temperature of a mixture of phthalimide, urea, and choline chloride.

A LTTM comprising Phthalimide (40 mole percent), urea (30 mole percent) and choline chloride (30 mole percent) was prepared. Differential scanning calorimetry spectrum of heat flow versus temperature was performed. The resultant differential scanning calorimetry spectrum is shown in FIG. 8. Inflection points can be observed indicating the onset of a phase transition process.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the disclosure, additionally, they do not exclude impurities and variances normally associated with the elements and materials used.

All numerical values within the detailed description and the claims herein modified by "about" or "approximately" with respect to the indicated value are intended to take into account experimental error and variations that would be expected by a person having ordinary skill in the art.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

What is claimed is:

1. A low-transition temperature material composition comprising:
    a hydrogen bond donor comprising urea;
    a redox-active phase comprising maleimide; and
    an ionically conducting organic salt comprising choline chloride,
    wherein the low-transition temperature material has a melting point of less than 100° C.

2. The composition of claim 1, wherein the redox-active phase further comprises at least one compound capable of undergoing a redox reaction wherein the at least one compound is selected from the group consisting of a cyclic polyols, dicarboxylic nitrogen heterocycles, and combinations thereof.

3. The composition of claim 1, wherein the redox-active phase further comprises at least one organic compound selected from the group consisting of squaric acid, naphthalenediol, catechol, nitrocatechol, catechol and nitrocatechol substituted by one or more hydrocarboxyl groups with carbon numbers from C1-C10, dihydroxybenzaldehyde, nitrodihydroxybenzaldehyde, dihydroxybenzaldehyde and nitrodihydroxybenzaldehyde substituted by one or more hydrocarboxyl groups with carbon numbers from C1-C10, maleimide, imidazolidinone, p arab ani c acid, N-aminophthalimide, phthalimide, 2,3-naphthalenedicarboximide, 3-aminophthalhydrazide, urazole, and combinations thereof.

4. The composition of claim 1, wherein the ionically conducting organic salt further comprises an additional quaternary ammonium salt capable of participating in a redox reaction with the redox-active phase.

5. The composition of claim 4, wherein the ionically conducting organic salt further comprises a compound selected from the group consisting of: distearylammonium chloride; glycine betaine; alkyl dibenzylammonium chloride; dodecyl dimethylammonium chloride; benzalkonium chloride; ionic liquids containing alkylimidazolium, phosphonium or ammonium cations; ionic liquids containing bis(trifluorosulfonylimide), tetrafluoroborate, and/or hexafluorophosphate anions; and combinations thereof.

6. The composition of claim 1, further comprising an additional hydrogen bond donor selected from the group consisting of ethylene glycol, glycerin, lactic acid, sulfuric acid, and combinations thereof.

7. The composition of claim 1, wherein the redox-active phase further comprises benzene-1,2-diol.

8. A method of making a low-transition temperature material comprising:
    combining a redox-active phase comprising maleimide, an ionically conducting organic salt comprising choline chloride, and urea to form a solid composite; and
    melting the mixture to form the low-transition temperature material, wherein the low-transition temperature material has a melting point of less than 100° C.

9. The method of claim 8, wherein the redox-active phase further comprises at least one compound capable of undergoing a redox reaction wherein the at least one compound is selected from the group consisting of a cyclic polyols, dicarboxylic nitrogen heterocycles, and combinations thereof.

10. The method of claim 8, wherein the redox-active phase further comprises at least one organic compound selected from the group consisting of squaric acid, naphthalenediol, catechol, nitrocatechol, catechol and nitrocatechol substituted by one or more hydrocarboxyl groups with carbon numbers from C1-C10, dihydroxybenzaldehyde, nitrodihydroxybenzaldehyde, dihydroxybenzaldehyde and nitrodihydroxybenzaldehyde substituted by one or more hydrocarboxyl groups with carbon numbers from C1-C10, maleimide, imidazolidinone, parabanic acid, N-aminophthalimide, phthalimide, 2,3-naphthalenedicarboximide, 3-aminophthalhydrazide, urazole, and combinations thereof.

11. The method of claim 8, wherein the ionically conducting organic salt further comprises an additional quaternary ammonium salt capable of participating in a redox reaction with the redox-active phase.

12. The method of claim 11, wherein the conducting organic salt further comprises a compound selected from the group consisting of: distearylammonium chloride; glycine betaine; alkyl dibenzylammonium chloride; dodecyl dimethylammonium chloride; benzalkonium chloride; ionic liquids containing alkylimidazolium, phosphonium or ammonium cations; ionic liquids containing bis (trifluorosulfonylimide), tetrafluoroborate, and/or hexafluorophosphate anions; and combinations thereof.

13. The method of claim 8, wherein the low-transition temperature material further comprises an additional hydrogen bond donor selected from ethylene glycol, glycerin, lactic acid, sulfuric acid, and combinations thereof.

* * * * *